United States Patent
Nair et al.

(10) Patent No.: US 12,454,925 B2
(45) Date of Patent: Oct. 28, 2025

(54) SYSTEMS AND METHODS OF USING A FUEL INJECTOR AS A PRESSURE SENSOR TO DETECT TOP-DEAD-CENTER FOR A CYLINDER

(71) Applicant: Cummins Inc., Columbus, IN (US)

(72) Inventors: Shailesh Nair, Pune (IN); Mayur H. Borate, Maharashtra (IN); Srinivas Kumar Mulukutla, Pune (IN); Panendra Kumar Sahu, Pimpri Chinchwad (IN); David Michael Carey, Bend, OR (US)

(73) Assignee: Cummins Inc., Columbus, IN (US)

( * ) Notice: Subject to any disclaimer, the term of this patent is extended or adjusted under 35 U.S.C. 154(b) by 24 days.

(21) Appl. No.: 18/495,690

(22) Filed: Oct. 26, 2023

(65) Prior Publication Data
US 2025/0137417 A1    May 1, 2025

Related U.S. Application Data

(63) Continuation of application No. PCT/US2022/027497, filed on May 3, 2022.

(51) Int. Cl.
*F02D 41/38* (2006.01)
*F02D 1/06* (2006.01)

(52) U.S. Cl.
CPC .......... *F02D 41/3845* (2013.01); *F02D 1/06* (2013.01); *F02D 2041/389* (2013.01); *F02D 2200/024* (2013.01); *F02D 2200/0602* (2013.01)

(58) Field of Classification Search
CPC .. F02D 41/3845; F02D 1/06; F02D 2041/389; F02D 2200/024; F02D 2200/0602; F02D 2200/0616; F02D 2250/14; F02D 35/023; F02D 35/024; F02D 41/402; B02B 3/10; Y02T 10/40
See application file for complete search history.

(56) References Cited

U.S. PATENT DOCUMENTS 8,899,203 B2    12/2014  Thomas
9,228,525 B2     1/2016  Nistler et al.
(Continued)

FOREIGN PATENT DOCUMENTS

WO    WO-2017134329 A1 *  8/2017  ............. G01L 23/08

OTHER PUBLICATIONS

International Search Report and Written Opinion, PCTUS2227497, Aug. 9, 2022, 8 pgs.

*Primary Examiner* — Phutthiwat Wongwian
*Assistant Examiner* — Diem T Tran
(74) *Attorney, Agent, or Firm* — Taft, Stettinius & Hollister LLP

(57) ABSTRACT

A pressure-based piston top-dead-center ("TDC") position measurement system is disclosed, comprising: a fuel injector configured to inject fuel into a combustion chamber bounded in part by the piston; and a controller configured to control the fuel injector to cause a fuel injection when the piston is at each of a plurality of different positions relative to TDC while ensuring fuel is provided to the fuel injector at a substantially constant pressure. The controller is further configured to estimate a pressure in the combustion chamber in response to each fuel injection, fit a curve to the estimated pressures, and determine a TDC position of the piston as correlating with a maximum pressure on the curve.

20 Claims, 8 Drawing Sheets

(56) References Cited

U.S. PATENT DOCUMENTS

| | | |
|---|---|---|
| 10,208,686 B1 | 2/2019 | Thomas et al. |
| 10,385,814 B2 | 8/2019 | Sgatti et al. |
| 2009/0139489 A1 | 6/2009 | Serra et al. |
| 2009/0223487 A1 | 9/2009 | Dingle |

* cited by examiner

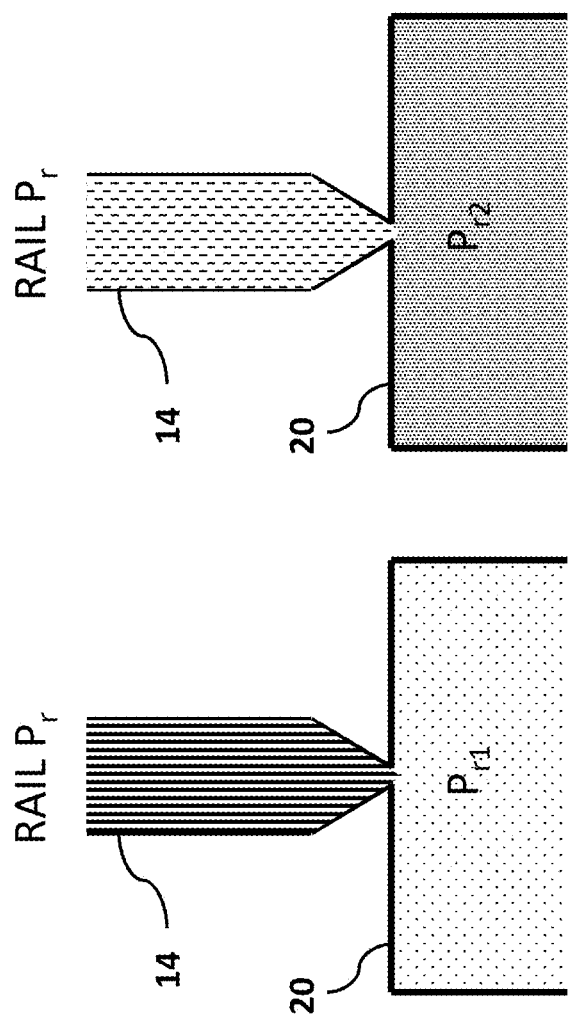

SYSTEMS AND METHODS OF USING A FUEL INJECTOR AS A PRESSURE SENSOR TO DETECT TOP-DEAD-CENTER FOR A CYLINDER

CROSS REFERENCE TO RELATED APPLICATIONS

The present application is a continuation of International Application No. PCT/US2022/27497 filed May 3, 2022 which claims the benefit of and priority to Reference is hereby made to commonly assigned Indian Patent Application number 202111020242, filed on May 3, 2021, and entitled "SYSTEMS AND METHODS OF USING FUEL INJECTOR AS A PRESSURE SENSOR TO DETECT TDC FOR CYLINDER", both of which are incorporated herein by reference in its their entirety and for all purposes.

FIELD

Disclosed embodiments relate generally to fuel injection control for an internal combustion engine, and more specifically to improving start-of-injection timing by detecting the actual top-dead-center ("TDC") position of a piston using a fuel injector as a pressure sensor.

BACKGROUND

Generally, internal combustion engines use fuel injectors to inject fuel into cylinders housing reciprocating pistons. For optimal combustion, which results in improved fuel efficiency and reduced emissions, it is important to inject the fuel at precise timing relative to the position of the piston. This requires that the controller that controls operation of the injectors knows the position of the pistons as they travel between bottom-dead-center ("BDC") and top-dead-center ("TDC"). In many engine arrangements, the position of the pistons are indicated by output signals from one or more crankshaft sensors. Essentially, if the rotational position of the crankshaft is known, the positions of the pistons (connected to the crankshaft) are also known. However, as the engine ages the crankshaft can shift and the crank angle indicated by the crank sensor may be off by several degrees relative to the actual crank angle. Consequently, the controller, using the incorrect crank angle to determine piston position, may cause the injectors to inject fuel too early or too late (depending upon the direction of the inaccuracy) in the cycle. This may result in incomplete combustion, which leads to reduced fuel efficiency and increase emissions. Accordingly, there is a clear need for improvements in this area.

SUMMARY

In one embodiment, the present disclosure provides a system for determining a top-dead-center ("TDC") position of a piston configured to reciprocate in an engine cylinder, comprising: a fuel injector fluidically coupled to a fuel accumulator and configured to inject fuel from the accumulator into the engine cylinder; a pressure sensor positioned to sense pressure of fuel in the accumulator; and a controller in communication with the fuel injector and the pressure sensor, the controller being programmed to receive signals from the pressure sensor indicating the sensed pressure of fuel in the accumulator, prevent fuel flow into the accumulator when the sensed pressure corresponds to a desired pressure, after fuel flow into the accumulator is prevented, cause the fuel injector to provide a plurality of fuel injections into the engine cylinder when the piston is in a corresponding plurality of positions in the engine cylinder, estimate a corresponding plurality of cylinder pressures in response to the plurality of fuel injections, fit a curve to the plurality of estimated cylinder pressures, determine a maximum pressure value on the curve, and correlate the maximum pressure value to a true TDC position of the piston. In one aspect of this embodiment, the controller prevents fuel flow into the accumulator by at least one of cutting off operation of a fuel pump or closing an inlet metering valve. In another aspect, each of the plurality of fuel injections is for a fixed period of time. In yet another aspect, the controller is programmed to estimate cylinder pressure by calculating a fuel flow through the fuel injector, and estimating the cylinder pressure using the calculated fuel flow. In still another aspect of this embodiment, the plurality of fuel injections include a first fuel injection when the piston is in a first position in the engine cylinder, a second fuel injection when the piston is in a second position in the engine cylinder, and a third fuel injection when the piston is in a third position in the engine cylinder. In another aspect, the system determines the TDC position of the piston during an engine maintenance event. In yet another aspect, the controller is programmed to cause the fuel injector to provide the plurality of fuel injections into the engine cylinder during a non-ballistic region of a curve corresponding to the fuel injector.

In another embodiment of the present disclosure, a method is provided of using a fuel injector to determine a top-dead-center ("TDC") position of a piston configured to reciprocate in an engine cylinder, comprising: receiving signals from a pressure sensor indicating a sensed pressure of fuel in an accumulator fluidically coupled to the fuel injector; responding to the sensed pressure corresponding to a desired pressure by preventing fuel flow into the accumulator; after preventing fuel flow into the accumulator, causing the fuel injector to provide a plurality of fuel injections into the engine cylinder when the piston is in a corresponding plurality of positions in the engine cylinder; estimating a corresponding plurality of cylinder pressures in response to the plurality of fuel injections; fitting a curve to the plurality of estimated cylinder pressures; determining a maximum pressure value on the curve; and correlating the maximum pressure value to a true TDC position of the piston. In one aspect of this embodiment, preventing fuel flow into the accumulator includes at least one of cutting off operation of a fuel pump or closing an inlet metering valve. In another aspect, each of the plurality of fuel injections is for a fixed period of time. In still another aspect of this embodiment, estimating a corresponding plurality of cylinder pressures includes calculating fuel flows through the fuel injector, and estimating the cylinder pressures using the calculated fuel flows. In another aspect, the plurality of fuel injections include a first fuel injection when the piston is in a first position in the engine cylinder, a second fuel injection when the piston is in a second position in the engine cylinder, and a third fuel injection when the piston is in a third position in the engine cylinder. In yet another aspect, the method is performed during an engine maintenance event. In another aspect of this embodiment, causing the fuel injector to provide a plurality of fuel injections into the engine cylinder when the piston is in a corresponding plurality of positions in the engine cylinder includes providing the plurality of fuel injections during a non-ballistic region of a curve corresponding to the fuel injector.

In still another embodiment of the present disclosure, a pressure-based piston top-dead-center ("TDC") position measurement system is provided, comprising: a fuel injector configured to inject fuel into a combustion chamber bounded in part by the piston; and a controller configured to control the fuel injector to cause a fuel injection when the piston is at each of a plurality of different positions relative to TDC while ensuring fuel is provided to the fuel injector at a substantially constant pressure; wherein the controller is further configured to estimate a pressure in the combustion chamber in response to each fuel injection, fit a curve to the estimated pressures, and determine a TDC position of the piston as correlating with a maximum pressure on the curve. In one aspect of this embodiment, the fuel is provided to the fuel injector at a substantially constant pressure by an accumulator, the controller deactivating an input source to the accumulator before causing the fuel injections. In a variant of this aspect, the input source is one of a fuel pump or an inlet metering valve. In another aspect, each of the fuel injections is for a fixed period of time. In still another aspect of this embodiment, the controller is configured to estimate the pressure in the combustion chamber using a calculated fuel flow through the fuel injector. In another aspect, the plurality of different positions of the piston includes at least three different positions.

It should be appreciated that in various embodiments the foregoing concepts, and additional concepts discussed below, may be arranged in any suitable combination. Further, other advantages and novel features of the present disclosure will become apparent from the following detailed description of various non-limiting embodiments when considered in conjunction with the accompanying figures.

BRIEF DESCRIPTION OF THE DRAWINGS

The accompanying drawings are not intended to be drawn to scale. In the drawings, each identical or nearly identical component that is illustrated in various figures may be represented by a like numeral. For purposes of clarity, not every component may be labeled in every drawing. In the drawings:

FIG. 4A is a conceptual diagram of a fuel injector and a cylinder with a first internal pressure;

FIG. 4B is a conceptual diagram of a fuel injector and a cylinder with a second internal pressure;

DETAILED DESCRIPTION

Figure 1:
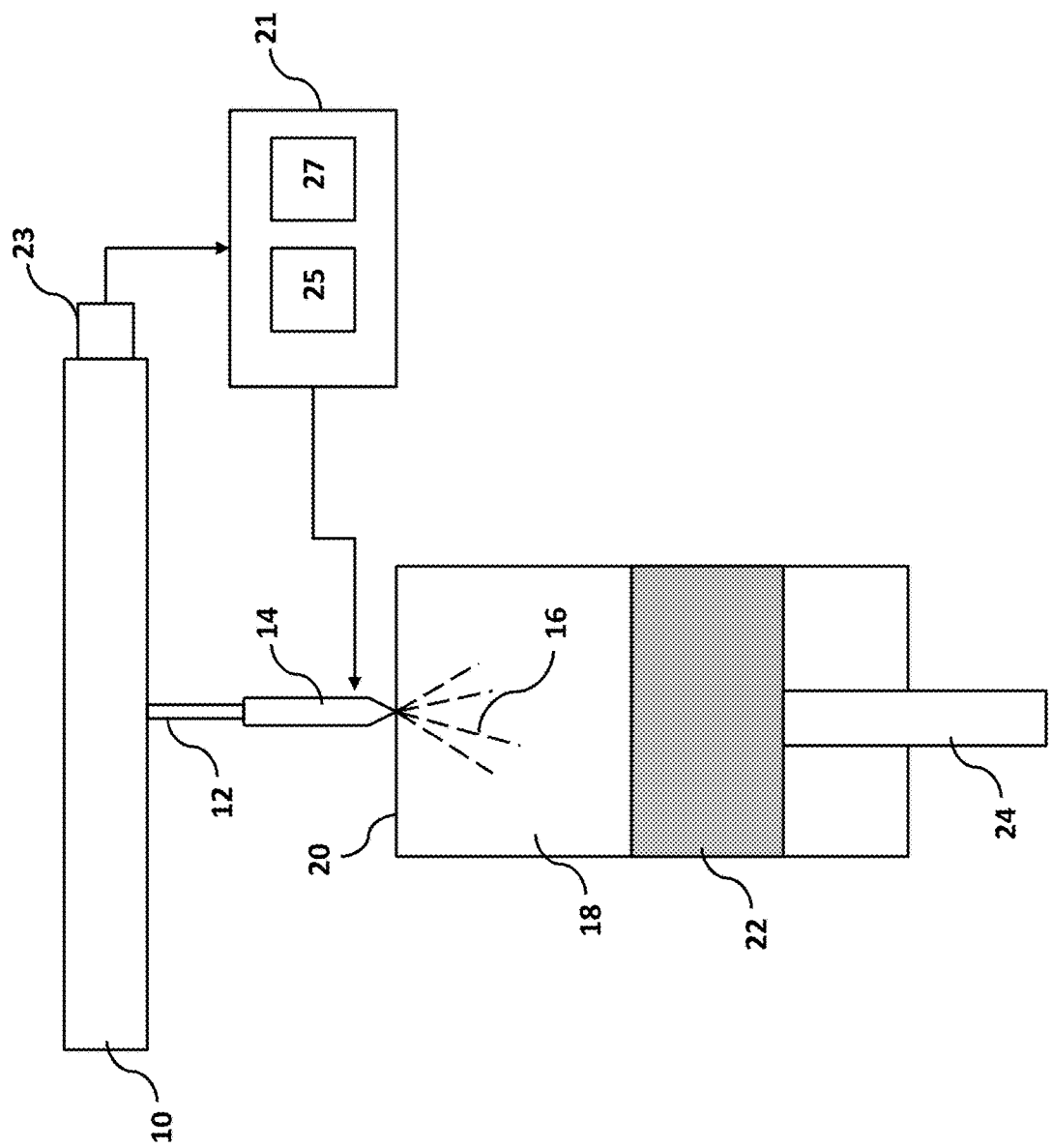
FIG. 1 is a conceptual diagram of a fueling system for an engine cylinder.

Referring now to FIG. 1, a high-level conceptual diagram of a fueling system for an engine is shown. Many components are omitted for clarity. Generally, a fuel pump system (not shown) provides fuel to a fuel accumulator hereinafter referred to as common rail 10. Typically, the high pressure fuel in common rail 10 is routed through conduits 12 (only one shown) to a plurality of fuel injectors 14 (only one shown) which provide controlled injections of fuel 16 into a corresponding combustion chamber 18 (only one shown) of a corresponding engine cylinder 20 (only one shown). The timing of the fuel injections is controlled by a controller 21, which may also monitor the pressure of fuel in common rail 10 by receiving pressure signals from a pressure sensor 23. A piston 22 connected to a connecting rod 24 reciprocates within cylinder 20 between a bottom-dead-center ("BDC") position and a top-dead-center ("TDC") position. Depending upon the type of engine, the fuel/air mixture in combustion chamber 18 is ignited (either compression ignited or spark ignited) as piston 22 approaches TDC, and the explosion forces piston 22 downwardly, transferring power through connecting rod 24 to cause a crankshaft (not shown) to rotate.

Controller 21 may be part of an engine control module or ECM. Alternatively, controller 21 may be a separate fuel injector controller. Controller 21 may include a processor 25 and a memory storage device 27. Processor 25 may be any suitable processor such as a central processing unit (CPU), state machines, system-on-chip (SoC), etc. The memory storage device 27 may be any suitable memory such as random access memory (RAM), read-only memory (ROM), flash memory, etc.

In some examples, the components that are electrically coupled with controller 21 have one or more sensors (not shown) coupled thereto that take measurements which indicate the present status of the component, such as the pressure in common rail 10, among others. In some examples, such data is stored in memory storage device 27 of controller 21 such that controller 21 may use the stored data at any time without having to take new measurement when needed. In some examples, the data in memory storage device 27 is updated frequently at a constant rate, i.e., new measurements are taken at predetermined intervals, such that "freshness" of the data is maintained. Controller 21 in some examples has instructions, e.g., computing algorithms, stored in memory storage device 27 which processor 25 uses to perform the process as disclosed herein.

Controller 21 may form a portion of a processing subsystem including one or more computing devices having non-transient computer readable storage media, processors or processing circuits, and communication hardware. Controller 21 may be a single device or a distributed device, and the functions of the controller may be performed by hardware and/or by processing instructions stored on non-transient machine-readable storage media. Example processors include an application specific integrated circuit (ASIC), a field programmable gate array (FPGA), a digital signal processor (DSP), and a microprocessor including firmware. Example non-transient computer readable storage media includes random access memory (RAM), read only memory (ROM), flash memory, hard disk storage, electronically erasable and programmable ROM (EEPROM), electronically programmable ROM (EPROM), magnetic disk storage, and any other medium which can be used to carry or store processing instructions and data structures and which can be accessed by a general purpose or special purpose computer or other processing device.

Certain operations of controller 21 described herein include operations to interpret and/or to determine one or more parameters. Interpreting or determining, as utilized herein, includes receiving values by any method known in the art, including from a datalink, network communication or input device, receiving an electronic signal (e.g. a voltage, frequency, current, or pulse-width-modulation signal) indicative of the value, such as the common rail 10 pressure, receiving a computer generated parameter indicative of the value, reading the value from a memory location on a non-transient machine readable storage medium, receiving the value as a run-time parameter by any means known in the art, and/or by receiving a value by which the interpreted parameter can be calculated, and/or by referencing a default value that is interpreted to be the parameter value.

The term "logic" as used herein includes software and/or firmware executing on one or more programmable processors, application-specific integrated circuits, field-programmable gate arrays, digital signal processors, hardwired logic, or combinations thereof. Therefore, in accordance with the embodiments, various logic may be implemented in any appropriate fashion and would remain in accordance with the embodiments herein disclosed.

The embodiments of the technology described herein can be implemented in any of numerous ways. For example, the embodiments may be implemented using hardware, software or a combination thereof. When implemented in software, the software code can be executed on any suitable processor or collection of processors, whether provided in a single computing device or distributed among multiple computing devices. Such processors may be implemented as integrated circuits, with one or more processors in an integrated circuit component, including commercially available integrated circuit components known in the art by names such as CPU chips, GPU chips, microprocessor, microcontroller, or co-processor. Alternatively, a processor may be implemented in custom circuitry, such as an ASIC, or semicustom circuitry resulting from configuring a programmable logic device. As yet a further alternative, a processor may be a portion of a larger circuit or semiconductor device, whether commercially available, semi-custom or custom. As a specific example, some commercially available microprocessors have multiple cores such that one or a subset of those cores may constitute a processor. Though, a processor may be implemented using circuitry in any suitable format.

Also, the various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine.

In this respect, the disclosed embodiments may be embodied as a computer readable storage medium (or multiple computer readable media) (e.g., a computer memory, one or more floppy discs, compact discs (CD), optical discs, digital video disks (DVD), magnetic tapes, flash memories, circuit configurations in Field Programmable Gate Arrays or other semiconductor devices, or other tangible computer storage medium) encoded with one or more programs that, when executed on one or more computers or other processors, perform methods that implement the various embodiments of the disclosure discussed herein. As is apparent from the foregoing examples, a computer readable storage medium may retain information for a sufficient time to provide computer-executable instructions in a non-transitory form. Such a computer readable storage medium or media can be transportable, such that the program or programs stored thereon can be loaded onto one or more different computers or other processors to implement various aspects of the present disclosure as discussed above. As used herein, the term "computer-readable storage medium" encompasses only a non-transitory computer-readable medium that can be considered to be a manufacture (i.e., article of manufacture) or a machine. Alternatively or additionally, the disclosure may be embodied as a computer readable medium other than a computer-readable storage medium, such as a propagating signal.

The terms "program" or "software" are used herein in a generic sense to refer to any type of computer code or set of computer-executable instructions that can be employed to program a computing device or other processor to implement various aspects of the present disclosure as discussed above. Additionally, it should be appreciated that according to one aspect of the disclosure, one or more computer programs that when executed perform methods of the present disclosure need not reside on a single computer or processor, but may be distributed in a modular fashion amongst a number of different computers or processors to implement various aspects of the present disclosure.

Computer-executable instructions may be in many forms, such as program modules, executed by one or more computers or other devices. Generally, program modules include routines, programs, objects, components, data structures, etc. that perform particular tasks or implement particular abstract data types. Typically, the functionality of the program modules may be combined or distributed as desired in various embodiments.

Also, data structures may be stored in computer-readable media in any suitable form. For simplicity of illustration, data structures may be shown to have fields that are related through location in the data structure. Such relationships may likewise be achieved by assigning storage for the fields with locations in a computer-readable medium that conveys relationship between the fields. However, any suitable mechanism may be used to establish a relationship between information in fields of a data structure, including through the use of pointers, tags or other mechanisms that establish relationship between data elements.

According to the principles of the present disclosure, it is possible to use fuel injector 14 as a pressure sensor to detect the true TDC position of piston 22 within cylinder 20. As is further described below, controller 21 cuts off fuel to common rail 10 so the pressure in common rail 10 is constant. Controller 21 then causes injector 14 to inject fuel for a constant duration at least three times as piston 22 moves through a reciprocation cycle. By monitoring the drop in pressure in common rail 10 using pressure sensor 23, controller 21 can estimate the fuel pressure in combustion chamber 18 for each injection. A curve is fit to these data points and the maximum of the curve is identified as corresponding to the true TDC position of piston 22.

Figure 2:
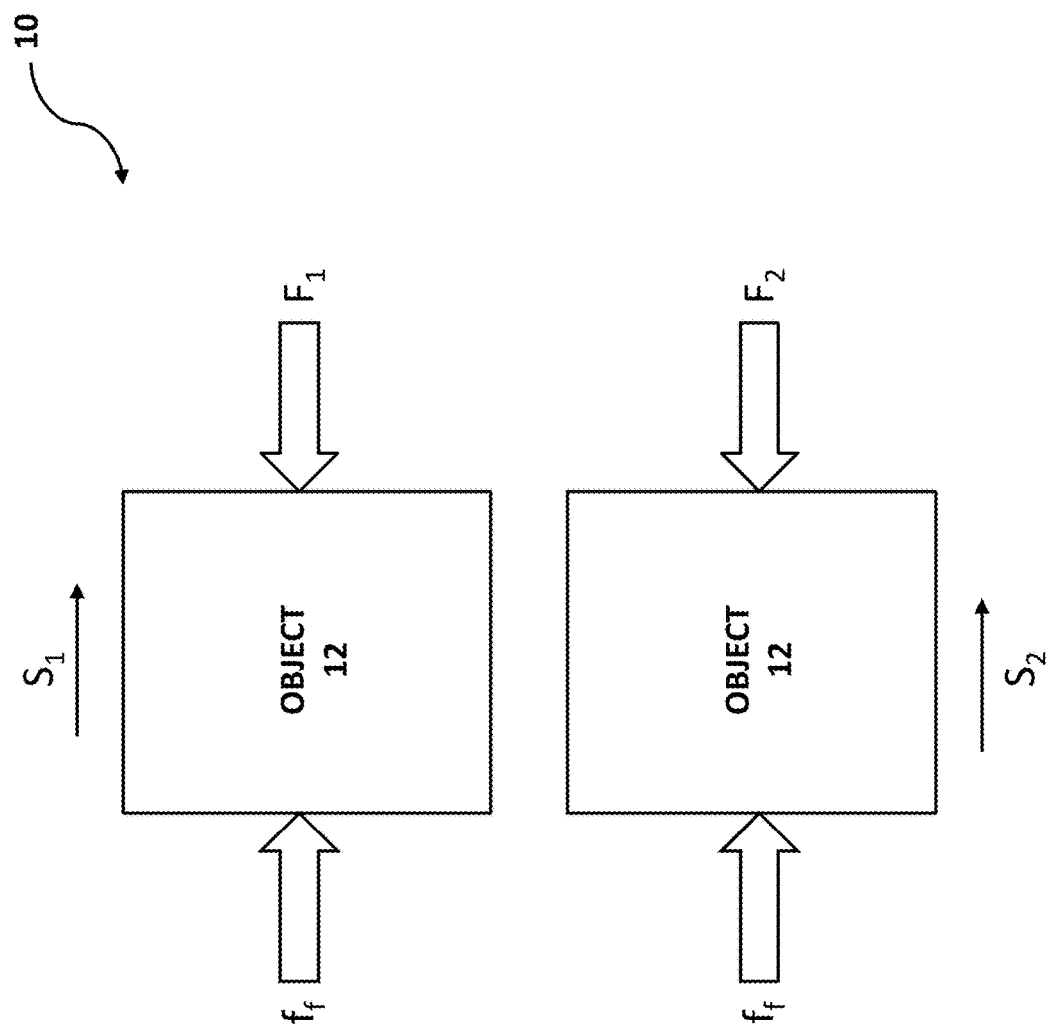
FIG. 2 is a high-level conceptual diagram illustrating forces applied to an object.
Figure 3B:
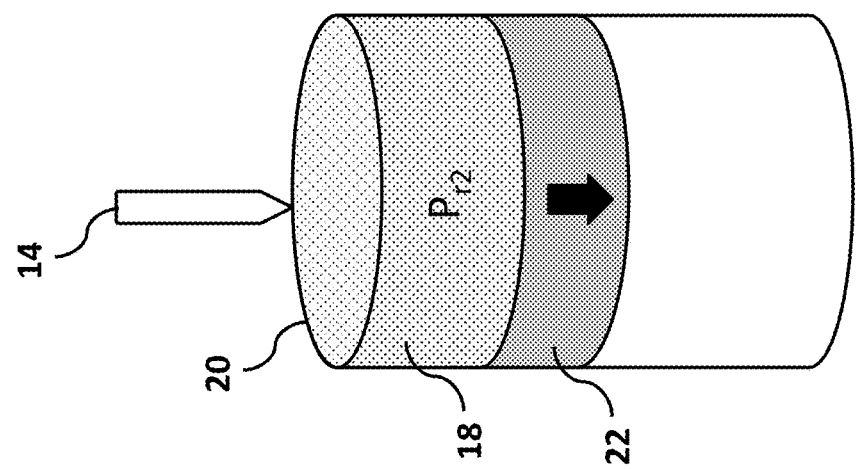
FIG. 3B is a conceptual, perspective view of a cylinder of an internal combustion engine with a piston in a second position.
Figure 3A:
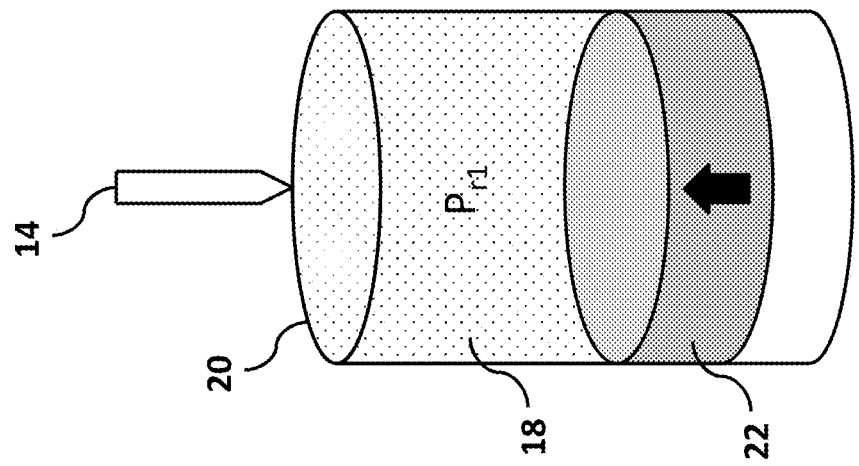
FIG. 3A is a conceptual, perspective view of a cylinder of an internal combustion engine with a piston in a first position.

Referring now to FIG. 2, a basic concept underlying the present disclosure is shown. It is known that at a constant common rail pressure ($P_{r1}$), if a fuel injection is performed by injector 14 for a fixed time period, then the amount of fuel injected differs between the two cases shown in FIG. 2 as $P_{r1} \ll P_{r2}$. In the upper case, if $f_f > F_1$, then object 12 is displaced as indicated by $S_1$. Similarly, if $f_f > F_2$, then object 12 is displaced as indicated by $S_2$. Also, if $F_2 \gg F_1$, then $S_2 \ll S_1$. The force $f_f$ in this concept is the same applied from the left onto object 12 in both cases shown in FIG. 2, while $F_1$ and $F_2$ are the counter forces applied which are both less than $f_f$. Applying these principles to FIG. 1, $f_f$ corresponds to the fuel pressure in common rail 10, $F_1$ corresponds to the pressure in combustion chamber 18 when piston 22 is at BDC and $F_2$ corresponds to the pressure in combustion chamber 18 when piston 22 is at TDC.

In FIGS. 3A, 3B, 4A and 4B, $P_{r1}$ is the pressure within combustion chamber 18 of cylinder 20 when piston 22 is at BDC and $P_{r2}$ is the pressure within combustion chamber 18 of cylinder 20 when piston 22 is at TDC. FIGS. 4A and 4B are simplified diagrams of FIGS. 3A and 3B, respectively. As shown in FIG. 4A, the pressure differential across injector 14 when piston 22 is at BDC is the rail pressure $P_r$ minus $P_{r1}$. Similarly, the pressure differential across injector 14 when piston 22 is at TDC is the rail pressure $P_r$ minus $P_{r2}$. The dark shading in injector 14 in FIG. 4A represents the large pressure differential between $P_r$ and $P_{r1}$. The pressure differential in FIG. 4B is smaller (and therefore lighter) because $P_{r2}$ is higher as a result of piston 22 being at TDC.

According to the present disclosure, the rail pressure may be kept essentially constant by cutting out the fuel pump (not shown) to thereby permit use of a crank synchronous pressure signal to determine the pressure drop ($\Delta P$) across injector 14 for a corresponding fuel quantity injected. As such, $\Delta P_1$ and $\Delta P_2$ can be obtained for injections done at different piston positions because there would be different fuel injection amounts. In this manner, injector 14 may be used as a pressure sensor to obtain information about the actual TDC position of piston 22 as is further described below.

It is known that the flow of a fluid through an orifice can be represented as $\varphi = A \times V$ (EQ. 1), where A is the area of the orifice and V is the velocity of the fluid. Additionally, from Bernoulli's principle that an increase in the speed of a fluid occurs simultaneously with a decrease in static pressure, it is known that $$P + \frac{1}{2}\rho v^2 + \rho gh = \text{constant}, \quad \text{(EQ. 2)}$$

where P is pressure, $\rho$ is density, v is flow speed, g is acceleration due to gravity and h is the hydraulic head. Since the factor $\mu gh$ is essentially the same on both sides of the pilot valve of the injector, $$P + \frac{1}{2}\rho v_1^2 = P_2 + \frac{1}{2}\rho v_2^2.$$

It follows then that $$P_1 - P_2 = \frac{1}{2}\rho(v_2^2 - v_1^2),$$

where the variables with a 1 subscript are on the common rail 10 side of injector 14 and the variables with a 2 subscript are on the cylinder 20 side of injector 14. When the common rail 10 pressure $P_1$ is much greater than the combustion chamber 18 pressure $P_2$ (i.e., $P_1 \gg P_2$), $v_2$ is greater than $v_1$. Thus, as ($P_1 - P_2$) changes, ($v_2 - v_1$) also changes. Using the above understanding and EQ. 1, it can be determined that as ($P_1 - P_2$) changes, the flow across the orifice of injector 14 changes, and therefore, the quantity of fuel injected changes.

By holding the common rail 10 pressure ($P_1$) constant (i.e., during pump cutout), it is possible to take multiple measurements by setting $P_2$ to different values. $P_2$ is at different values depending upon the position of piston 22 in its cycle between BDC and TDC. The corresponding pressure drop measurements for injections can then be related to $P_2$ and therefore to the timing of the injection (i.e., the position of piston 22). As should be apparent from the foregoing, when piston 22 is at TDC, pressure $P_2$ is at its highest value during the cycle, and hence the injection quantity and the related $\Delta P$ is the lowest. Thus, with three or more readings as described above, it is possible to fit a curve to the data to relate $\Delta P$ with the injection timing.

Figure 5:
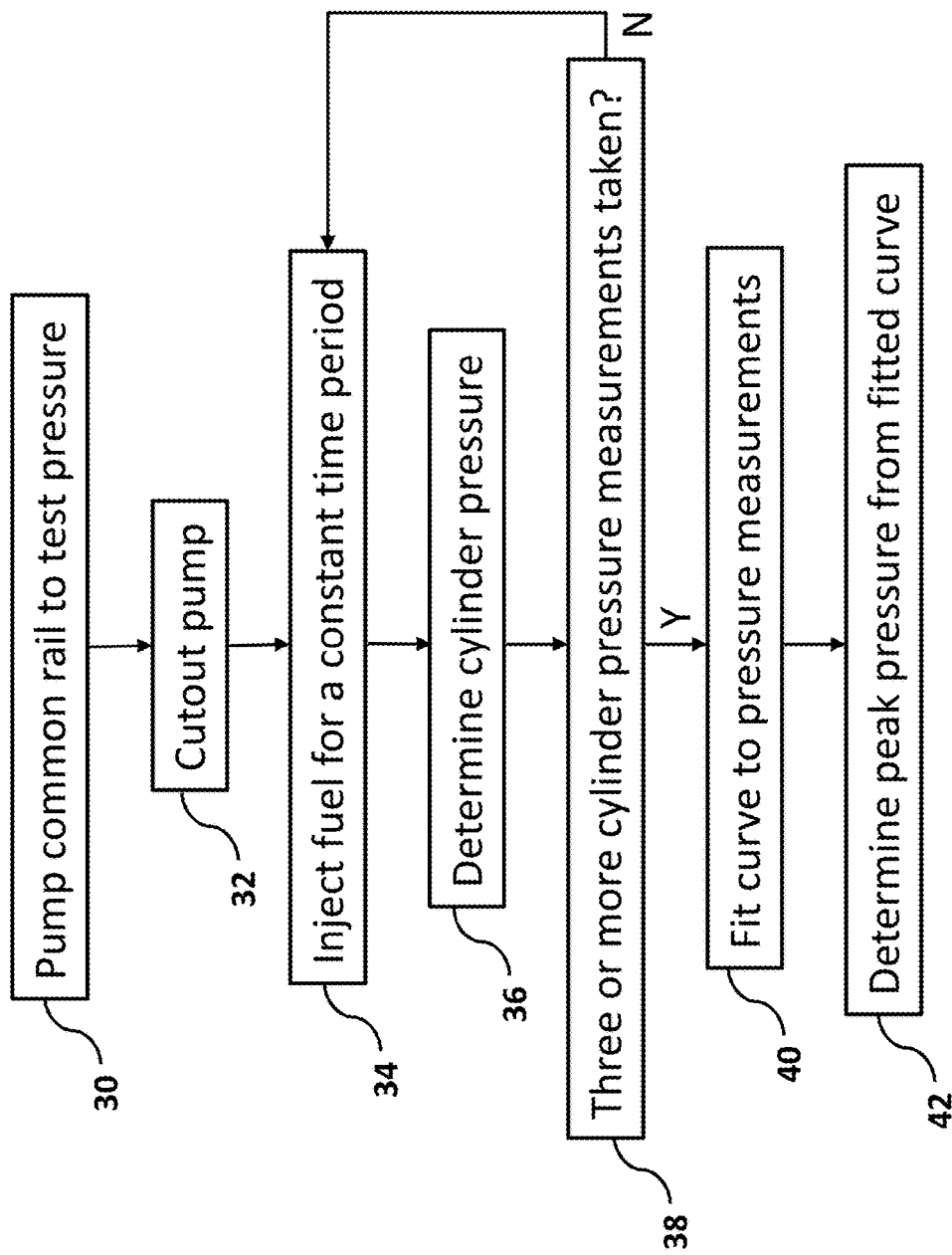
FIG. 5 is a flow chart depicting a method of determining a piston's position according to the principles of the present disclosure.

A process for determining a TDC position of a piston according to the principles of the present invention is depicted in FIG. 5. At step 30, fuel is pumped to common rail 10 until the pressure (as sensed by common rail pressure sensor 23) reaches a desired test pressure ("$P_{in}$"). When common rail 10 reaches the desired test pressure, controller 21 cuts out the fuel pump and/or closes an inlet metering valve (not shown) at step 32 to prevent further fuel from entering common rail 10. In this manner, the rail pressure will be essentially constant each of the fuel injections to follow as described below. At step 34, controller 21 causes fuel injector 14 to inject fuel into combustion chamber 18 for a specific period of time. As is further described below, the fuel injection time at step 34 is the same for all fuel injection events at step 34 such that the area of the orifice ("A") of injector 14 is constant.

As explained above, by holding the common rail 10 pressure (i.e., input pressure $P_{in}$) constant and the orifice area A constant, the flow across the orifice of injector 14 will be proportional to the pressure at the outlet of the orifice, which is corresponds to the pressure in combustion chamber 18 or the cylinder pressure. The cylinder pressure is determined at step 36. At step 38 it is determined whether three or more cylinder pressure measurements have been performed in the manner described above for the current testing cycle. If not, then the process returns to step 34 for another fuel injection and step 36 for another cylinder pressure determination. This process repeats until at least three cylinder pressure measurements are made, at which point the process continues to step 40.

From the determination of the cylinder pressure, the fuel flow through injector 14 is estimated using the drop in pressure across injector 14 (i.e., the difference between $P_{in}$ and the cylinder pressure). It is known that the motoring cylinder pressure is a function of piston movement and remains relatively constant for a mechanically sound cylinder 20. As such, the shape of the P-$\theta$ curve (i.e., the curve of cylinder pressure versus piston position) also remains unchanged. Given the cylinder pressure measurements or estimates described above, a P-$\theta$ curve may fitted to the data by adjusting $\theta$ (i.e., the P-$\theta$ curve can be moved along the x-axis to fit the pressure data). This process is performed at step 40. Finally, at step 42 the peak cylinder pressure is determined from the fitted curve and the corresponding piston position $\theta$ is determined to be the true TDC position of piston 22.

It should be understood from the foregoing that the resolution of the described process for determining the true TDC position of piston 22 may be improved by using more than three fuel injections. Also, resolution may be improved by using lower speeds, lower rail pressure (i.e., lower desired test pressure) and/or longer fuel injector 14 on times. Additionally, greater resolution may be obtained by performing fuel injections during the non-ballistic region of the fuel injector curve. Finally, the above-described process may be repeated for multiple cylinders 20 and the results may be averaged to improve resolution.

Figure 6:
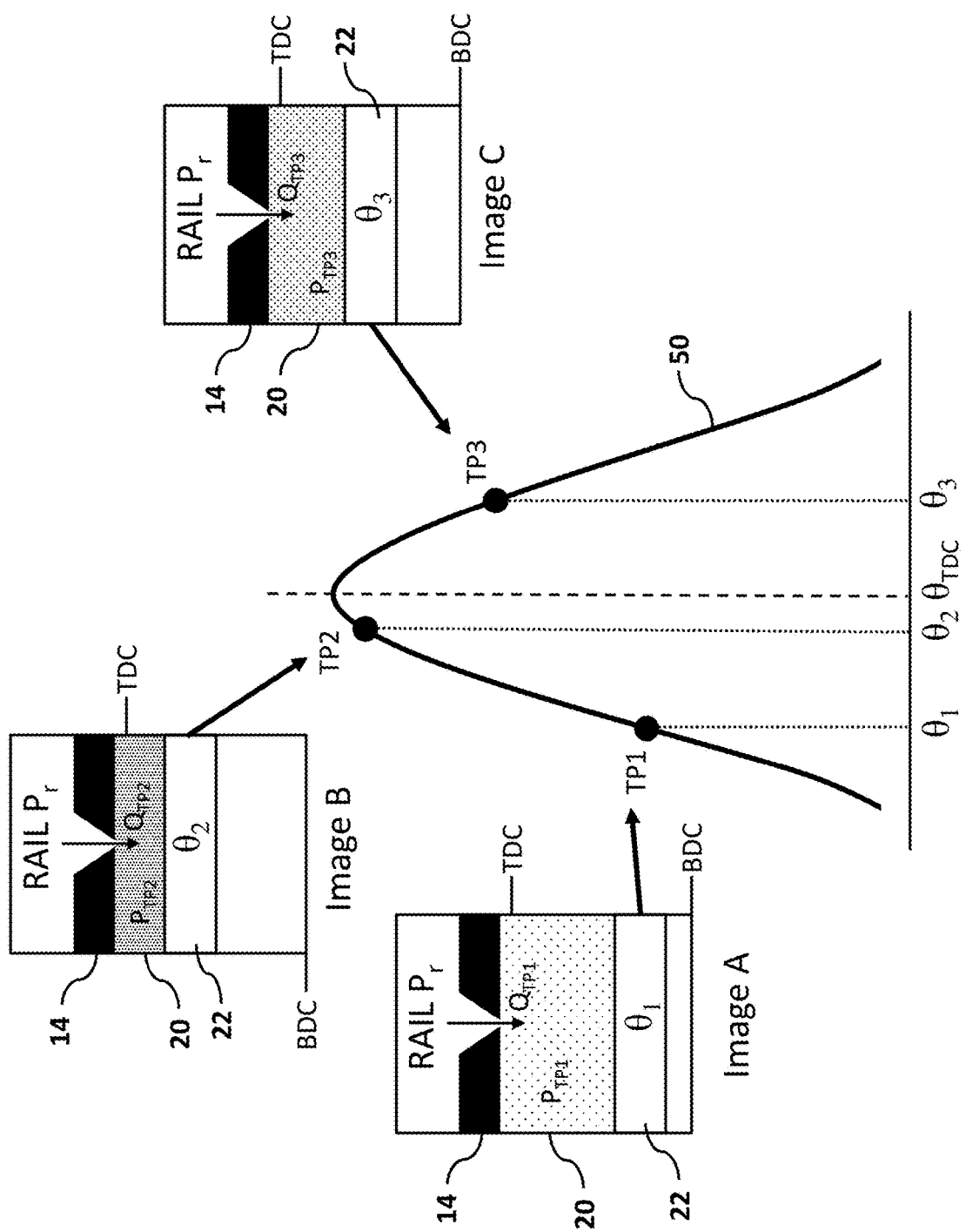
FIG. 6 is a diagram depicting measurements of a piston's position during an engine cycle using a method according to the present disclosure, along with accompanying conceptual cylinder diagrams for each measurement.

FIG. 6 provides a conceptual depiction of the process described above with reference to FIG. 5. Image A represents piston 22 at displacement position $\theta_1$, image B represents piston 22 at displacement position $\theta_2$, and image C represents piston 22 at displacement position $\theta_3$. As shown, piston 22 is near BDC in image A when the first cylinder pressure measurement ("$P_{TP1}$") is made as described above. More specifically, as piston 26 travels from BDC to TDC, fuel is cutoff to common rail 10 such that the common rail pressure $P_r$ is at the desired test pressure. When piston 22 is at the position shown in image A, fuel is injected by injector 14 for a fixed period of time. The drop in rail pressure as a result of the injection permits an estimate of fuel flow ("$Q_{TP1}$") as described above. The flow is then used to approximate the pressure in cylinder $P_{TP1}$. This results in generation of test point 1 ("TP1") as shown in the figure.

At a later time in the current cycle corresponding to image B when piston 22 is at position $\theta_2$, fuel is again injected for the same fixed period of time. As indicated in the figure, the cylinder pressure $P_{TP2}$ is higher as piston 22 is closer to TDC. This measurement corresponds to TP2. Similarly, when piston 22 is at position $\theta_3$, another fixed injection is made, and the cylinder pressure $P_{TP3}$ is measured as TP3.

When each of TP1, TP2 and TP3 are calculated, a curve is fit to the data points using any of a variety of curve fitting techniques. The curve is shown as 50 in FIG. 6. Finally, a peak of curve 50 is determined and may be computed as corresponding to $\theta_{TDC}$, or the true TDC of piston 22.

Figure 7:
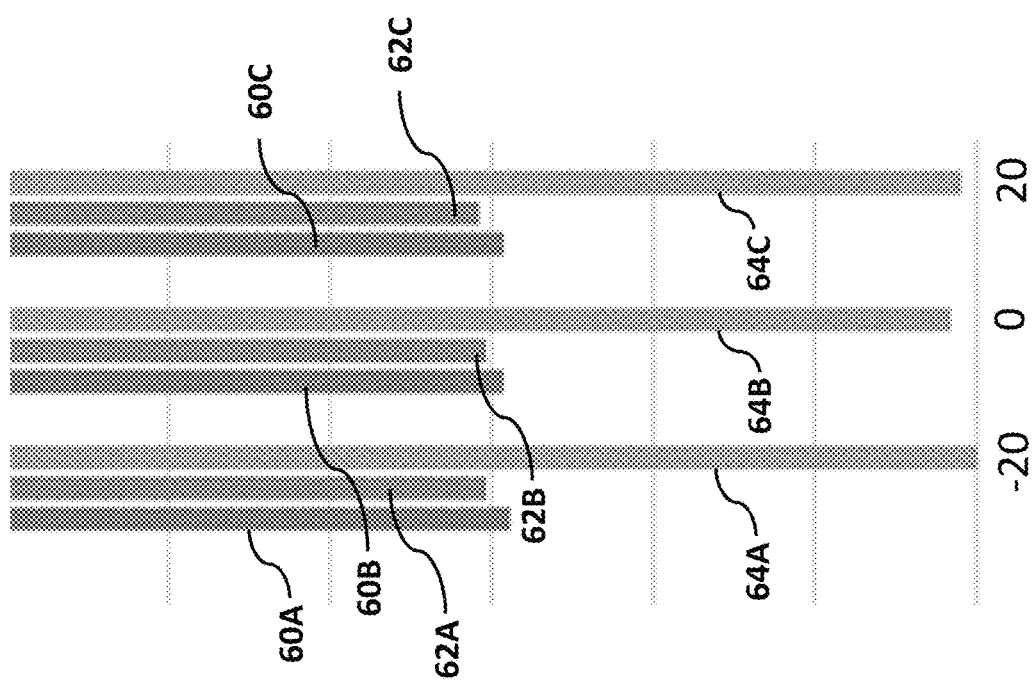
FIG. 7 is a graph depicting actual pressure drop measurements for three different types of fuel injector at three different piston positions according to the present disclosure.

Referring now to FIG. 7, actual pressure drop data is shown for a cylinder using three different injection parameter sets for three separate measurements. The first pressure drop bars labeled 60A-C correspond to 20 mg fuel injections and a common rail 10 pressure of 500 bar. Pressure drop bar 60A is the first of three injections with a start of injection ("SOI") at −5 degrees. Pressure drop bar 60B corresponds to a SOI of zero degrees. Pressure drop bar 60C corresponds to a SOI of +5 degrees. It can be seen that pressure drops represented by bars 60A-C are slightly different for each of the three injections.

Pressure drop bars 62A-C also correspond to 20 mg fuel injections and a common rail 10 pressure of 500 bar. These measurements, however, correspond to SOIs at −25 degrees, zero degrees, and +25 degrees, respectively. Pressure drop bars 64A-C correspond to a higher level of fuel injection, and provide greater differences in pressure drops for the three measurements. More specifically, pressure drop bars 64A-C correspond to 40 mg fuel injections, a common rail 10 pressure of 500 bar, and SOIs of −20 degrees, zero degrees, and +20 degrees.

Figure 8:
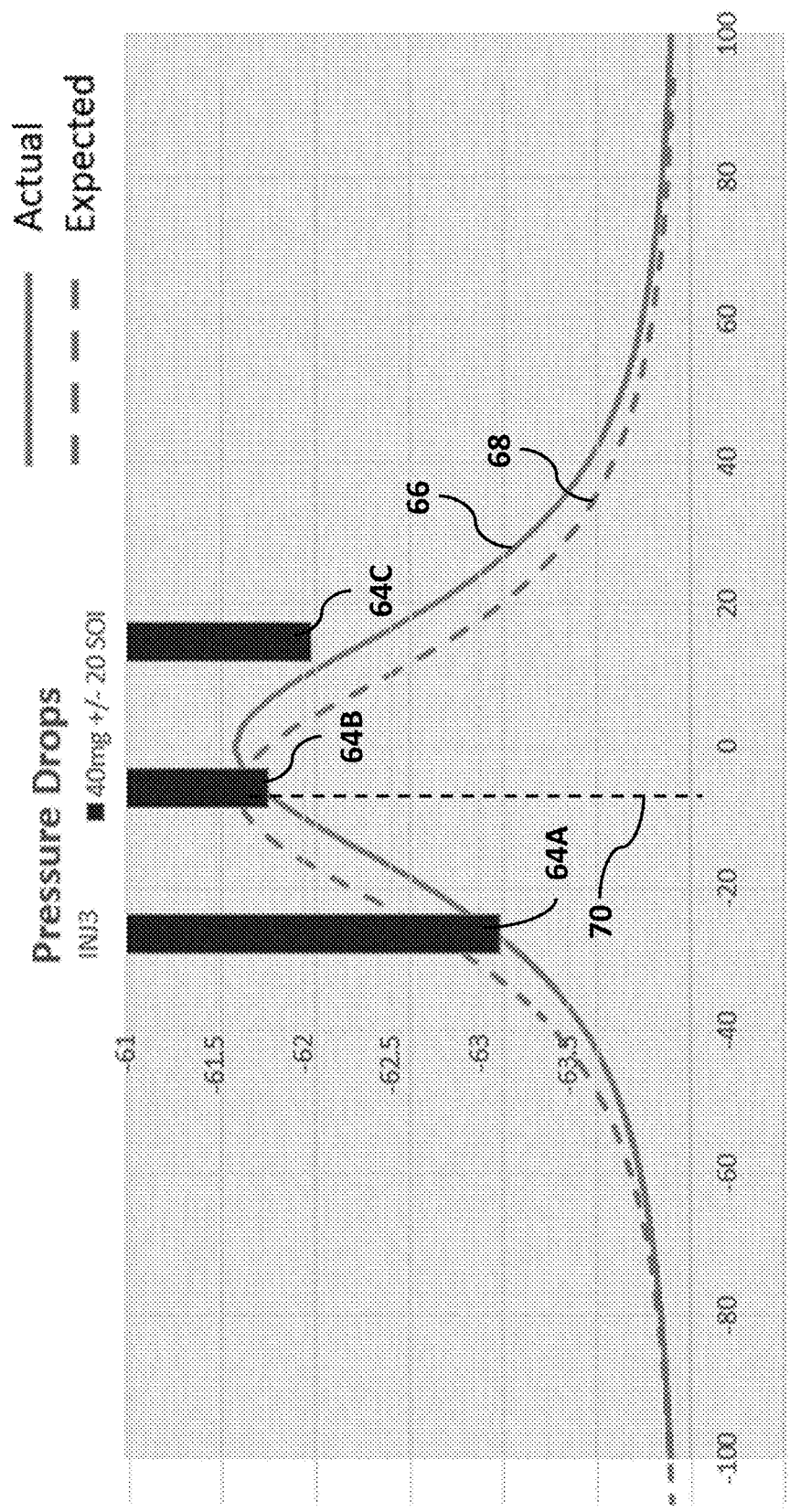
FIG. 8 is a graph depicting a comparison of an expected TDC position for a piston and an actual TDC position determined using the pressure drop measurements of FIG. 7.

FIG. 8 reproduces pressure drop bars 64A-C to depict the manner of operation of the present disclosure. As shown, a curve 66 is fitted to the pressure drop data represented by bars 64A-C. The peak of curve 66 corresponds to the true TDC position of piston 22. As is also shown, in this example curve 68 corresponds to the expected data for the cylinder 20 based, for example, on signals from one or more crankshaft sensors. In this example, the expected TDC position labeled 70 is several degrees different from the actual or true TDC position determined using the principles of the present disclosure.

In certain embodiments, the method and system described above is performed as a test during scheduled maintenance events. The data obtained during such a test may then be used in subsequent operation to improve fuel injection timing, and therefore fuel efficiency and emissions. It should be understood, however, that in other embodiments the measurements may be taken during run time. Additionally, while the principles of the present disclosure are described in the context of providing a true TDC estimation, it should be understood that the same principles may be used to detect mechanical degradation (e.g., loss of compression). Reference data may be collected at the end of line. Then, injector on-times are corrected for degradation based on non-motoring data. Using the same non-ballistic region on-time, the cylinder pressure may be estimated. By comparing the calculated peak pressure with the end of line reference data, mechanical degradation may be detected.

While various embodiments of the disclosure have been shown and described, it is understood that these embodiments are not limited thereto. The embodiments may be changed, modified and further applied by those skilled in the art. Therefore, these embodiments are not limited to the detail shown and described previously, but also include all such changes and modifications.

Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements. The scope is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B or C may be present in a single embodiment; for example, A and B, A and C, B and C, or A and B and C.

In the detailed description herein, references to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art with the benefit of the present disclosure to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. § 112 (f), unless the element is expressly recited using the phrase "means for." As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

While the present teachings have been described in conjunction with various embodiments and examples, it is not intended that the present teachings be limited to such embodiments or examples. On the contrary, the present teachings encompass various alternatives, modifications, and equivalents, as will be appreciated by those of skill in the art. Accordingly, the foregoing description and drawings are by way of example only.

What is claimed is:

1. A system for determining a top-dead-center ("TDC") position of a piston configured to reciprocate in an engine cylinder, comprising:
   a fuel injector fluidically coupled to a fuel accumulator and configured to inject fuel from the fuel accumulator into the engine cylinder;
   a pressure sensor positioned to sense pressure of fuel in the fuel accumulator; and
   a controller in communication with the fuel injector and the pressure sensor, the controller being programmed to receive signals from the pressure sensor indicating the sensed pressure of fuel in the fuel accumulator,
      prevent fuel flow into the fuel accumulator when the sensed pressure of fuel corresponds to a desired fuel pressure,
      after fuel flow into the fuel accumulator is prevented, cause the fuel injector to provide a plurality of fuel injections into the engine cylinder when the piston is in a corresponding plurality of positions in the engine cylinder,
      estimate a corresponding plurality of cylinder pressures in response to the plurality of fuel injections,
      fit a curve to the corresponding plurality of cylinder pressures that have been estimated,
      determine a maximum cylinder pressure value on the curve, and
      correlate the maximum cylinder pressure value to a true TDC position of the piston.

2. The system of claim 1, wherein the controller prevents fuel flow into the fuel accumulator by at least one of cutting off operation of a fuel pump or closing an inlet metering valve.

3. The system of claim 1, wherein each of the plurality of fuel injections is for a fixed period of time.

4. The system of claim 1, wherein the controller is programmed to estimate a cylinder pressure by calculating a fuel flow through the fuel injector and estimating the cylinder pressure using the calculated fuel flow.

5. The system of claim 1, wherein the plurality of fuel injections include a first fuel injection when the piston is in a first position in the engine cylinder, a second fuel injection when the piston is in a second position in the engine cylinder, and a third fuel injection when the piston is in a third position in the engine cylinder.

6. The system of claim 1, wherein the system determines the TDC position of the piston during an engine maintenance event.

7. The system of claim 6, wherein the controller is programmed to cause the fuel injector to provide the plurality of fuel injections into the engine cylinder during a non-ballistic region of a curve corresponding to the fuel injector.

8. A method of using a fuel injector to determine a top-dead-center ("TDC") position of a piston configured to reciprocate in an engine cylinder, comprising:
   receiving signals from a pressure sensor indicating a sensed pressure of fuel in a fuel accumulator fluidically coupled to the fuel injector;
   responding to the sensed pressure of fuel corresponding to a desired fuel pressure, preventing fuel flow into the fuel accumulator;
   after preventing fuel flow into the fuel accumulator, causing the fuel injector to provide a plurality of fuel injections into the engine cylinder when the piston is in a corresponding plurality of positions in the engine cylinder;
   estimating a corresponding plurality of cylinder pressures in response to the plurality of fuel injections;
   estimating a plurality of accumulator fuel pressure drop measurements for injections corresponding to the corresponding plurality of cylinder pressures;
   fitting a curve to the plurality of accumulator fuel pressure drop measurements that have been estimated;
   determining a maximum pressure drop value on the curve; and
   correlating the maximum pressure drop value to a true TDC position of the piston.

9. The method of claim 8, wherein preventing fuel flow into the fuel accumulator includes at least one of cutting off operation of a fuel pump or closing an inlet metering valve.

10. The method of claim 8, wherein each of the plurality of fuel injections is for a fixed period of time.

11. The method of claim 8, wherein estimating a corresponding plurality of cylinder pressures includes calculating fuel flows through the fuel injector and estimating the cylinder pressures using the calculated fuel flows.

12. The method of claim 8, wherein the plurality of fuel injections include a first fuel injection when the piston is in a first position in the engine cylinder, a second fuel injection when the piston is in a second position in the engine cylinder, and a third fuel injection when the piston is in a third position in the engine cylinder.

13. The method of claim 8, wherein the method is performed during an engine maintenance event.

14. The method of claim 8, wherein causing the fuel injector to provide a plurality of fuel injections into the engine cylinder when the piston is in a corresponding plurality of positions in the engine cylinder includes providing the plurality of fuel injections during a non-ballistic region of a curve corresponding to the fuel injector.

15. A pressure-based piston top-dead-center ("TDC") position measurement system, comprising:
   a fuel injector configured to inject fuel into a combustion chamber bounded in part by a piston; and
   a controller configured to control the fuel injector to cause a fuel injection when the piston is at each of a plurality of different positions relative to TDC while ensuring fuel is provided to the fuel injector at a substantially constant pressure;
   wherein the controller is further configured to estimate a pressure in the combustion chamber in response to each fuel injection, fit a curve to the pressures in the combustion chamber that have been estimated, and determine a TDC position of the piston as correlating with a maximum pressure on the curve.

16. The system of claim 15, wherein the fuel is provided to the fuel injector at the substantially constant pressure by a fuel accumulator, the controller deactivating an input source to the fuel accumulator before causing the fuel injections.

17. The system of claim 16, wherein the input source is one of a fuel pump or an inlet metering valve.

18. The system of claim 15, wherein each of the fuel injections is for a fixed period of time.

19. The system of claim 15, wherein the controller is configured to estimate a pressure in the combustion chamber using a calculated fuel flow through the fuel injector.

20. The system of claim 15, wherein the plurality of different positions of the piston includes at least three different positions.

* * * * *